Jan. 29, 1924.
E. R. MORTON
1,482,244
AIRPLANE CAMERA SUSPENSION
Original Filed Dec. 4, 1920
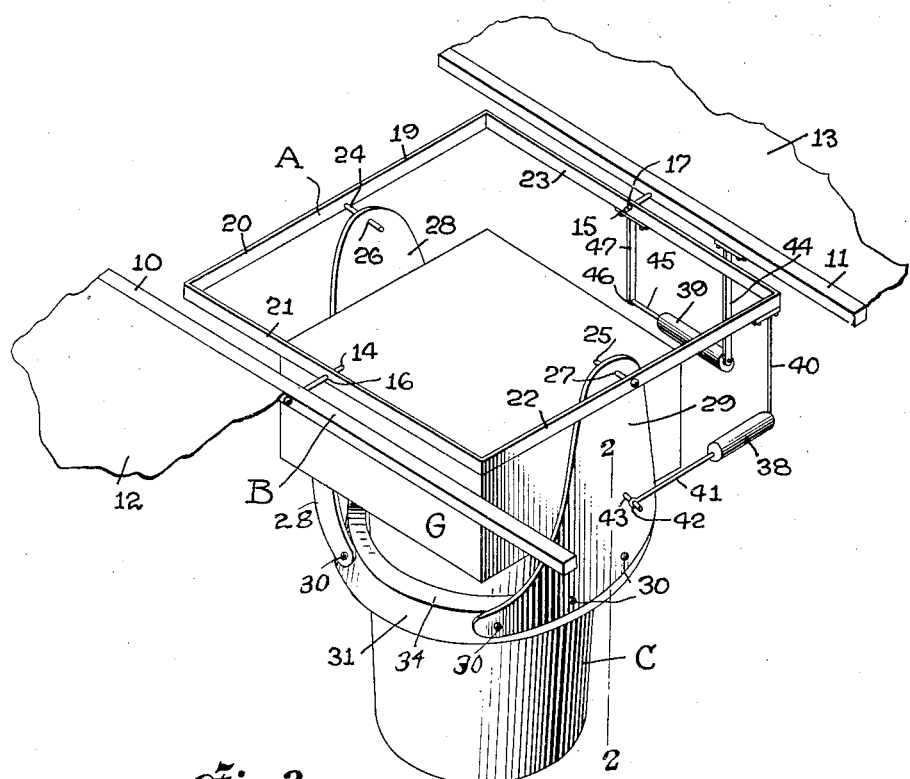
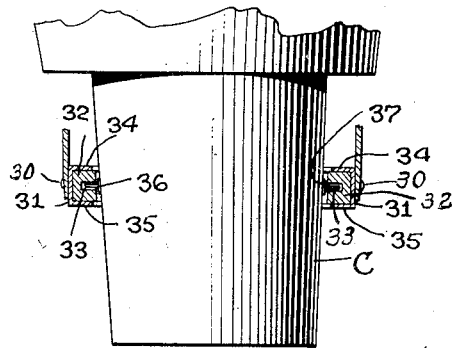

Patented Jan. 29, 1924.

1,482,244

UNITED STATES PATENT OFFICE.

EDMUND R. MORTON, OF NEW YORK, N. Y.

AIRPLANE-CAMERA SUSPENSION.

Application filed December 4, 1920, Serial No. 428,396. Renewed June 26, 1923.

*To all whom it may concern:*

Be it known that I, EDMUND R. MORTON, a citizen of the United States, and a resident of New York city, borough of Manhattan, county and State of New York, have invented an Improvement in Airplane-Camera Suspensions, of which the following is a specification.

My invention relates to mountings for cameras, particularly, but not exclusively, for cameras intended for use in airplanes or under similar conditions where it is desired to maintain a substantially vertical or other predetermined position of the camera although the body on which it is supported may change its position with respect to the vertical or horizontal.

It is the object of the present invention to provide camera mountings of the type referred to which shall avoid the numerous defects of the mountings hitherto used, by providing mountings which shall not only render it possible to maintain the camera in a substantially vertical or other predetermined position, but which shall also minimize the various oscillatory, vibratory and other undesirable motions of the camera which tend to blur the image of the objective especially when the camera is used on an airplane or similar device which is subject to changes of speed and direction and to the vibrations due to the motor and to air currents.

By way of example I have in the accompanying drawing shown an illustrative embodiment of my invention. It is, however, to be understood that my invention is not limited to the particular embodiment thereof which I shall herein set forth for purposes of illustration only.

Referring to the accompanying drawing, in which I have diagrammatically illustrated the foregoing embodiment of my invention:

Figure 1 is a perspective view of the mounting with the camera in place; and

Figure 2 is a fragmentary cross sectional view of the camera and its support taken along line 2—2 of Fig. 1.

In connection with the herein described embodiment of my invention it may be desirable briefly to survey the prior art to which the present invention relates.

The mountings for cameras, particularly for cameras intended to be used in airplanes, hitherto used may be divided into two classes. The first class is the pendular camera mounting in which the camera acts as a pendulum by being rotatably supported on an axis which is above its center of gravity or centroid. The fundamental disadvantage of this type of camera mounting or suspension is that this type of mounting is in direct contradiction to the requirement for eliminating excessive vibration of the camera due to motor vibration and air impacts. The second class of camera mounting is one in which the camera is supported solely in the plane of its center of gravity. The fundamental disadvantage of this type of camera mounting is that with this type of support it is not feasible to maintain the camera in a substantially constant vertical or other predetermined position as is the case where the camera is supported on the principle of a pendulum, as described in connection with the first class of mountings referred to above.

It is furthermore to be noted that neither the purely pendular type of support nor the purely center-of-gravity type of support performs its function perfectly, each type being a compromise and neither performing its function as satisfactorily as desired while entirely missing the advantages of the other type of mounting.

I have devised a new type of camera mounting or suspension by means of which I am enabled to combine the advantages and avoid many of the disadvantages of the two types of camera mountings referred to above.

To accomplish this desirable result I may, as in the case of the illustrative embodiment of my invention herein shown and described, support the camera as a pendulum or provide external means for maintaining the camera in a substantially vertical or other predetermined position. At the same time I provide at the area of greatest proximity or contact between the camera and its pendular or other orienting support resilient supporting means which are preferably located adjacent the center of gravity or centroid of the camera as a whole.

Referring to the illustrative embodiment herein shown and described, A indicates the camera mounting as a whole. This mounting includes the camera support B and the camera C.

The camera support B comprises a pendular support or other means for maintaining the camera in the desired vertical or other predetermined position. The supporting means herein shown comprises a plurality of attaching members 10 and 11 which are suitably attached to portions 12 and 13 of the fuselage or body of the airplane, it being understood, however, that the camera may be installed in other devices than airplanes if so desired. The attaching members 10 and 11 are provided with gimbals 14 and 15 passing through apertures 16 and 17, respectively, in the upper oscillatory member 19 of the support.

The member 19 comprises, in the example given, four rigidly connected supporting members 20, 21, 22 and 23, which are preferably arranged in the form of a rigid hollow square or rectangle. The members 20 and 22 are provided with the respective gimbals 24 and 25, which pass through the apertures 26 and 27 in the pendular arms 28 and 29. The pendular arms 28 and 29, which swing on the gimbals 24 and 25 which are supported above the centroid G of the camera are preferably formed as illustrated and serve by their arrangement with respect to the camera to support the same.

This support is of a resilient or flexible character and for this purpose the pendular arms 28 and 29 are, by means of screws or other fastening devices 30, rigidly secured to a ring 31 which is U-shaped in cross section. Within the hollow of this ring is a resilient member 32, preferaby consisting of sponge rubber and preferably provided with a substantially central circular slit 33. The resilient member 32 extends inwardly beyond the outer edges of the flanges 34 and 35 of the ring 31, so as to permit the body of the camera in proximity or contact to the ring 31 to come into or remain in free resilient or flexible contact with the inner face of the member 32.

The camera C is mounted in its support by means of two pins 36 and 37 which are rigidly secured to the camera body.

The arrangement of the supporting ring 31 and the resilient member 32 with respect to the camera is such as to permit the camera to have a slight oscillatory motion with respect to its support of an order of about less than five degrees, preferably from about one to about three degrees as, for example, about two degrees.

In order to damp excessive oscillation of the camera support B as a whole, air dash pots 38 and 39 are provided. The air dash pot 38 is pivotally attached by means of a bracket or other support 40 rigidly fastened to the member 22. The piston of the dash pot is carried by the rod 41, which is pivotally attached, as at 42, to a member 43 attached to the pendular arm 29. The dash pot 39 is pivotally attached by means of an arm or bracket 44 rigidly attached to the member 11. The piston of this dash pot is carried on a rod 45, which is pivotally attached as at 46 to a rod 47 carried by the member 23. It is also to be noted, as made clear in Figure 2, that the ring or equivalent supporting member 31 and also the area of greatest proximity on contact between the camera and its support are located substantially in the transverse plane passing through the centroid of the camera. It will be noted that this transverse plane practically includes the point or points of support or contact between the camera and its mounting.

The operation of the camera in its mounting will be substantially as follows:

By reason of the pendular or equivalent orienting support on which the camera is mounted, the camera will tend always to maintain an approximately vertical or other predetermined position. At the same time, by reason of the flexible or resilient positioning of the camera with respect to its support by means of the resilient member 32, which member is located approximately in the transverse plane passing through the centroid of the camera, undesirable vibrations will be largely eliminated.

It will be noted that the camera is permitted to swing slightly to accommodate itself to the varying impulses of acceleration, vibration and the like, to which it may be subjected. However, these vibrations are not permitted to be too extensive since the resilient member 32 may be in substantial contact with the camera throughout its circumferential extent. At the same time the dash pots 38 and 39 prevent too free vibration of the camera on its support and tend to stabilize the camera in its mounting.

By means of this device I am enabled to provide a highly efficient and useful camera mounting which is superior to the mountings hitherto in use and which possesses many advantages over mountings heretofore employed.

It is, of course, to be understood that my invention is not limited to the particular embodiment thereof herein shown and described for purposes of illustration only.

What I claim is:

1. In a camera mounting, a pendular support for the camera and means for providing resiliency between the camera and its support.

2. In a camera mounting, a support for the camera adapted to permit pendular movement of the camera under the action of gravity and means for providing resiliency between the camera and its support adjacent the region of greatest proximity between the camera and its support.

3. In a camera mounting, a support for the camera adapted to permit pendular movement of the camera and means for providing resiliency between the camera and its support adjacent the point of contact between the camera and its support.

4. In a camera mounting, a support for the camera adapted to permit pendular movement of the camera and means for resiliently positioning the camera with respect to its support, said means permitting a slight oscillatory movement of the camera with respect to its support of an order of less than about five degrees.

5. In a camera mounting, a support for the camera adapted to permit pendular movement of the camera and means for resiliently positioning the camera with respect to its support, said means permitting a slight oscillatory movement of the camera with respect to its support of an order of from about one to about three degrees.

6. In a camera mounting, a pendular support for the camera providing means for resiliently positioning the camera with respect to its support, said means being approximately located in the transverse plane passing through the center of gravity of the camera.

7. In a camera mounting, a pendular support for the camera providing means for resiliently positioning the camera with respect to its support, said means being approximately located in the transverse plane passing through the center of gravity of the camera and permitting a slight oscillatory movement of the camera with respect to its support of an order of from about one to about three degrees.

8. In a camera mounting, a pendular support for the camera and means for flexibly positioning the camera with respect to its support, said means being located approximately in the transverse plane passing through the centroid of the camera.

9. In a camera mounting, a support for the camera adapted to permit pendular movement of the camera under the action of gravity and means for flexibly positioning the camera with respect to its support, the region of contact between the camera and its support being located approximately in the transverse plane passing through the center of gravity of the camera.

10. In a camera mounting, a pendular support for the camera and means for flexibly positioning the camera with respect to its support, said means being located approximately in the transverse plane passing through the centroid of the camera and permitting an oscillatory movement of the camera with respect to its support of an order of about two degrees.

11. In a camera mounting, a support for the camera adapted to permit pendular movement of the camera under the action of gravity and means for flexibly positioning the camera with respect to its support, the region of contact between the camera and its support being located approximately in the transverse plane passing through the center of gravity of the camera and permitting an oscillatory movement of the camera with respect to its support of an order of about two degrees.

12. In a camera mounting, pendular supporting means providing resilient support for the camera.

13. In a camera mounting, a support for the camera adapted to permit pendular movement of the camera and providing means for resiliently positioning the camera with respect to its support.

14. In a camera mounting, a camera, a support therefor providing means for flexibly positioning the camera on the support, and means tending to maintain the camera in an approximately vertical position, said flexibly positioning means permitting a slight oscillatory movement of the camera with respect to its support of an order of from about one to about three degrees.

15. In a camera mounting, a support for the camera providing means for resiliently positioning the camera and means for maintaining the camera in an approximately vertical position, said resiliently positioning means permitting a slightly oscillatory movement of the camera with respect to its support of an order of from about one to about three degrees.

16. In a camera mounting, a pendular support for the camera, means for providing resiliency between the camera and its support, and means for damping the oscillations of said pendular support.

17. In a camera mounting, a pendular support for the camera, means for flexibly positioning the camera with respect to its support, said means being located approximately in the transverse plane passing through the centroid of the camera, and means for damping the oscillations of said pendular support.

In testimony whereof, I have signed my name to this specification this 6th day of November, 1920.

EDMUND R. MORTON.